April 23, 1963

M. F. CRIST 3,086,730

RETRACTABLE WING

Filed March 11, 1960

Meredith F. Crist
INVENTOR.

April 23, 1963

M. F. CRIST 3,086,730

RETRACTABLE WING

Filed March 11, 1960

Meredith F. Crist
INVENTOR.

BY *Clarence A. O'Brien*
*and Harvey B. Jackson*
Attorneys

April 23, 1963     M. F. CRIST     3,086,730
RETRACTABLE WING

Filed March 11, 1960     3 Sheets-Sheet 3

Meredith F. Crist
INVENTOR.

BY *Clarence A. O'Brien*
*and Harvey B. Jackson*
Attorneys

United States Patent Office 3,086,730
Patented Apr. 23, 1963

3,086,730
RETRACTABLE WING
Meredith F. Crist, Box 175, Sterling, Colo.
Filed Mar. 11, 1960, Ser. No. 14,367
13 Claims. (Cl. 244—43)

This invention relates to improvements in airplanes and more particularly to retractable wings.

An object of the invention is to provide an aircraft with a retractable wing wherein the tip portions of the semi-spans are adjustable inwardly and outwardly spanwise, and the motion of the tip portions coordinates the raising and lowering of landing wheels and cover panels for the landing wheels.

Briefly, the invention is embodied in an aircraft wing construction wherein each semi-span has a tip portion adjustable spanwise with reference to the root portion of the semi-span, together with a landing wheel and strut structure which is movable between a recessed position and a lowered position. A cover panel which closes the well in the semi-span that ordinarily houses the landing wheel and strut, is movable to an extended position in order to function as or in the nature of a landing flap.

An important feature of the invention is found in the nose wheel and strut adapted to operate in unison with the two landing wheels and struts that are carried by the wing structure. The nose wheel also has a cover panel functioning in the nature of a flap.

The benefits derived from the invention are in the production of high lift and high drag at certain operating conditions of the airplane with the result that shorter takeoff and landing runs are required, particularly for jet airplanes. There is a reduction in the wing area in flight, i.e., when the tip portions are retracted thereby increasing the speed of the aircraft by the elimination of some of the drag which is not needed for sustained flight.

Accordingly, a further object of the invention is to provide improvements in airplanes resulting in increased efficiency as to flight, landing and take-off and in landing strip length.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a front view of the airplane showing the wing tip portions partially extended whereas FIGURE 3 shows the wing tip portions fully extended.

Figure 1:
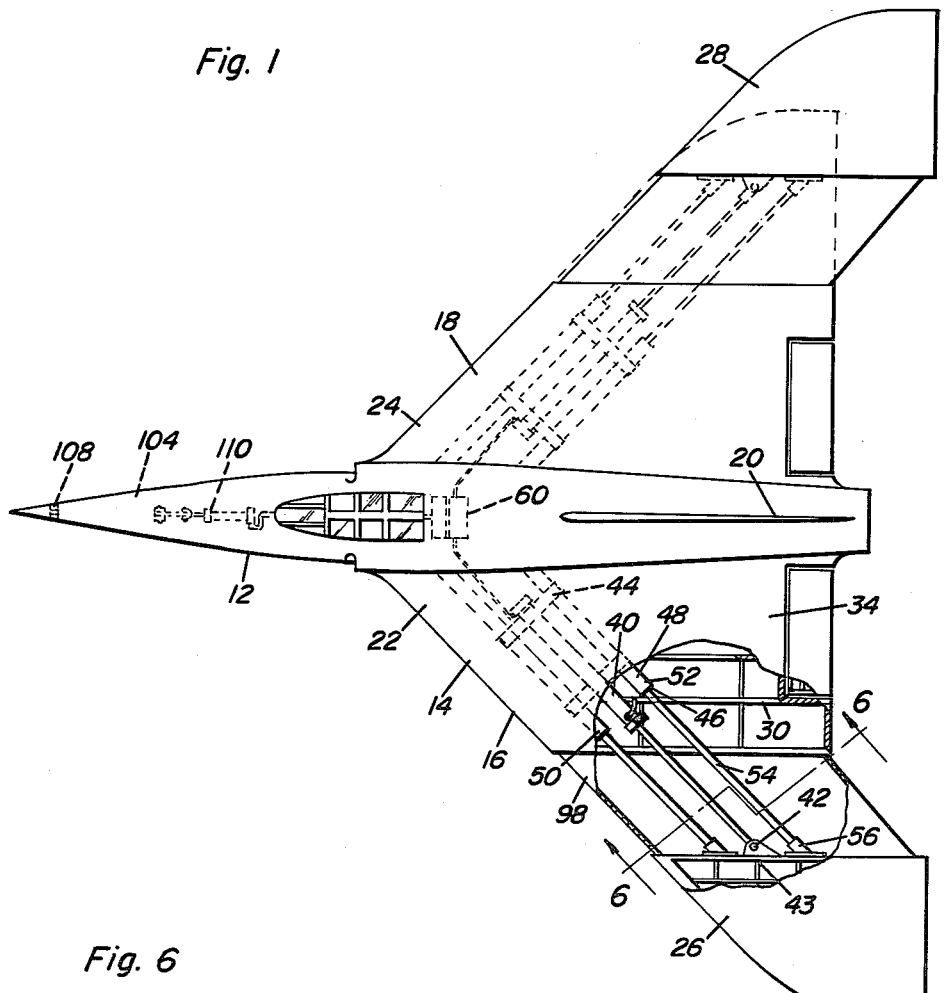
FIGURE 1 is a top plan view of an airplane constructed in accordance with the invention, portions being broken away in section to illustrate otherwise obscured detail.
Figure 6:
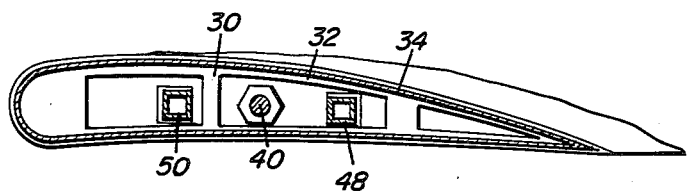
FIGURE 6 is a sectional view taken approximately on the line 6—6 of FIGURE 1.

In the accompanying drawings there is an illustration of an airplane 10 having a fuselage 12, a wing 14 including semi-spans 16 and 18 and an empennage 20.

Wing 14 has two identical semi-spans 16 and 18, and they are equipped with inboard panels 22 and 24 respectively connected with the airplane. The semi-spans also include outboard panels or tip portions 26 and 28 extensibly connected with the framework of the inboard panels. FIGURE 1 shows wing 14 as a swept back wing for high speed flight, although it is to be clearly understood that the actual configuration of the wing may be varied depending on the type of airplane with which the principles of the invention are applied.

Inboard panel 22 has a framework or frame 30 including ribs 32, one or more spars (not shown) and a skin 34. This is conventional wing structure design. There are means for extending and retracting the tip portion 26 with reference to the inboard panel 22, and although these means are shown as and preferably consist of a double acting hydraulic cylinder 40, mechanical or electrical means may be substituted. The double acting hydraulic cylinder 40 is connected by a pivot 42 to the frame 43 of tip portion 26. The inner end of the hydraulic cylinder may be rigidly secured or pivoted to a cross member 44 of a guide assembly 46. The guide assembly comprises two telescoping assemblies 48 and 50 secured at their inner ends to the frame of the aircraft or to the frame structure of the inboard panel 22. Each assembly 48 and 50 consists of an outer tube 52 and an inner tube 54, and by having the tubes 52 and 54 non-circular in cross section, tendencies to rotate with reference to each other are eliminated from the tube assemblies 48 and 50. The outer ends of the tubes are secured, for instance by welding, fixed sockets 56 or otherwise to the frame 43. Assemblies 48 and 50 are located on opposite sides of the hydraulic cylinder 40.

The means for extending and retracting the tip portions 26 and 28 include identical hydraulic cylinder assemblies, and the means for actuating the cylinders are conventional. Therefore these means are only diagrammatically represented as a hydraulic system 60 having a control in the cockpit of the airplane.

Figure 2:
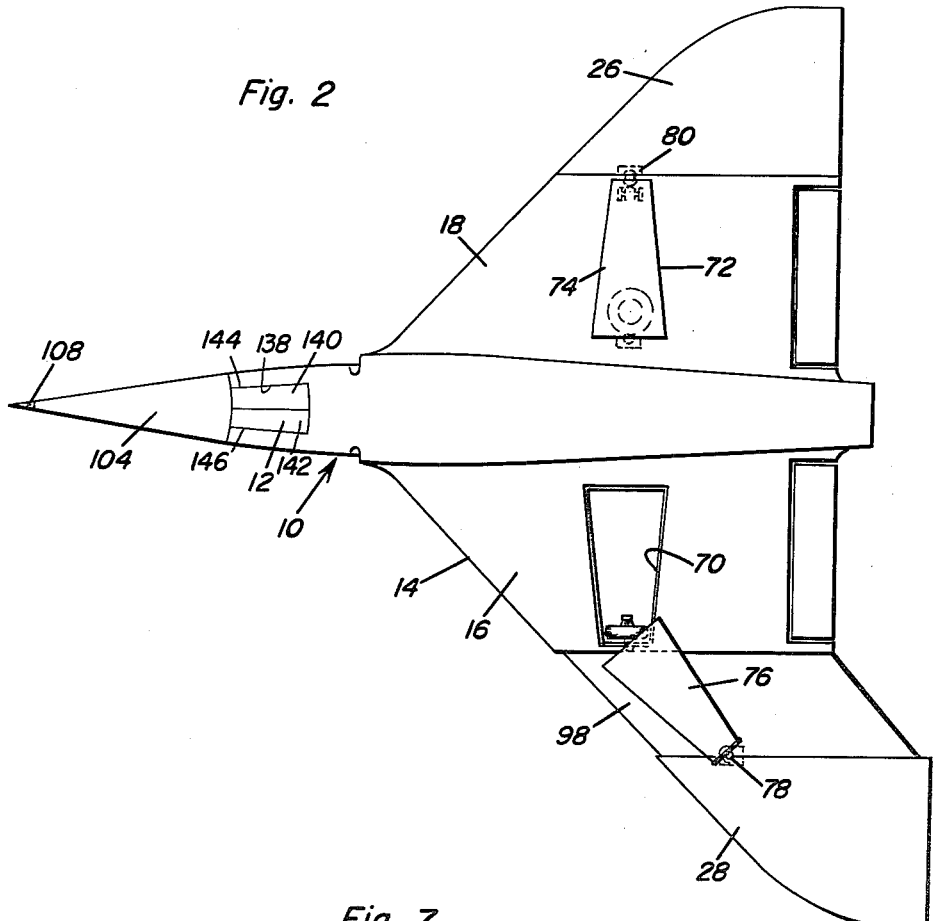
FIGURE 2 is a bottom plan view of the airplane in FIGURE 1.
Figure 9:
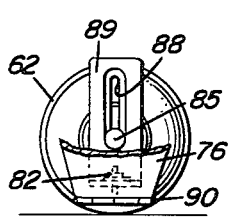
FIGURE 9 is a sectional view taken on the line 9—9 of FIGURE 8.
Figure 8:
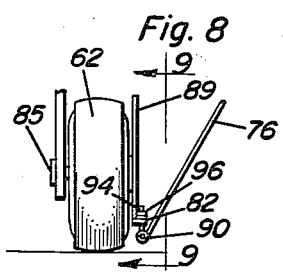
FIGURE 8 is an enlarged front elevational view showing one possible method of connection of the strut cover panel with one of the landing wheels.

There are two landing wheels 62 and 64 together with two conventional struts 66 and 68 pivoted to the framework of the inboard panels 22 and 24. These panels have wells 70 and 72 in the underside thereof to receive the struts and wheels (FIGURE 5) when the landing gear is in the retracted position. Cover panels 74 and 76 are attached at their outer ends by swivels 78 and 80 to the frame 43, and the panels are attached at their inner ends by swivels 82 to the spindles 85 and 86 of the wheel assemblies. Swivel 82 is shown in detail in FIGURES 8 and 9 and this method of connection is subject to design variation. Since the landing wheel 62 must move up and down in accordance with the operation of strut 66, the wheel spindle 85 is extended through a slot 88 in a plate 89. The plate has a hinge 90 at its lower end, and panel 76 is connected to this hinge. Instead of a rigid mechanical connection between hinge 90 and plate 89, spindle 94 is secured to one section of the hinge 90, and it extends through a bearing 96 that is attached to the lower extremity of plate 89 and protrudes laterally outwardly therefrom (FIGURE 8). This arrangement allows the wheel 62 to move up and down independently of cover panel 76, and movably connects the panel 76 with the wheel assembly so that differences in turning movements are compensated (FIGURE 2) during retraction and lowering of the wheels and struts. The swivel 78 and the swivel 80 may be made mechanically simple, i.e., a spindle and bearing similar to the spindle 94 and bearing 96.

Figure 3:
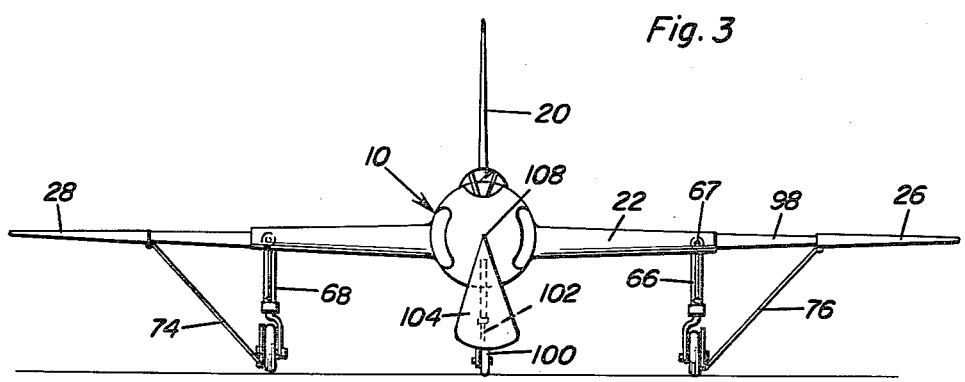
FIGURE 3 is a front view of the airplane in FIGURE 1.
Figure 4:
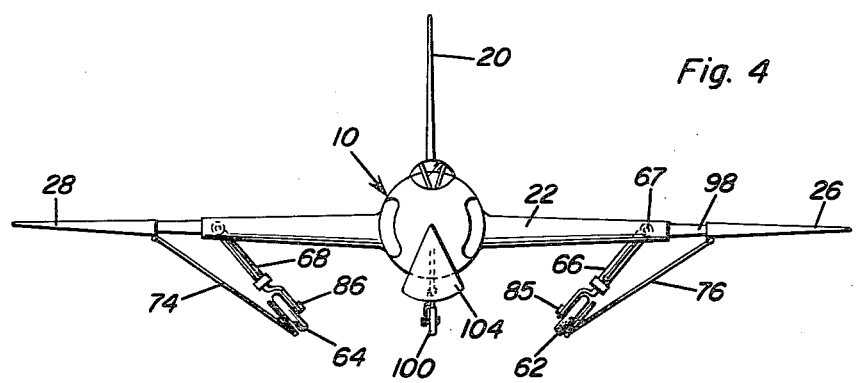
Figure 5:
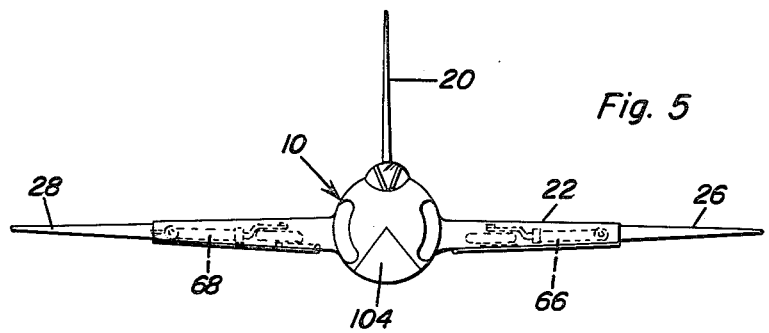
FIGURE 5 is a front view of the airplane showing the tip portions of the wing semi-spans completely retracted.

Upon inspection of FIGURES 3–5 the operation of this portion of the invention is deemed evident. The tip portions 26 and 28 may be extended or retracted, moving the fairing 98 inwardly and outwardly of the inboard panel 22 so that an opening does not exist between the outboard tip portion 26 and the inboard panel 22 when the tip portion 26 is extended. At the same time the cover 76 pivotally moves the strut 66 about its pivot 67. Of course, both tip portions 26 and 28 are operated in unison.

Figure 7:
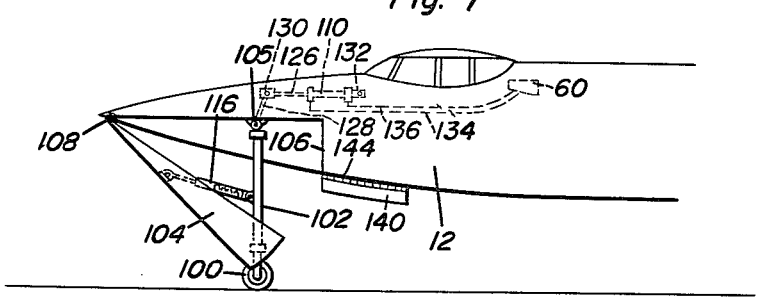
FIGURE 7 is a fragmentary side elevational view of the airplane showing principally the nose wheel and strut.
Figure 10:
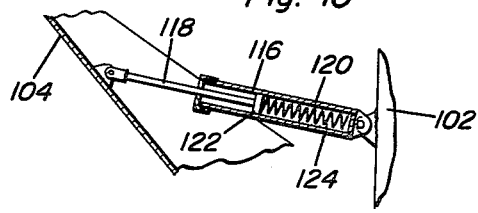
FIGURE 10 is a fragmentary sectional view showing a special link for coordinating the movement of a forward panel with the nose wheel of the landing gear.

Nose wheel 100 is attached to a strut 102, and the strut is pivotally mounted near the forward end of the fuselage by pivot 105. The strut 102 is housed within well 106 and is capable of being extended to the position shown in FIGURE 7. There is a cover panel 104 movably attached to the strut 102 and connected by hinge 108 to the frame of the aircraft. Hydraulic cylinder 110 is a double acting cylinder, and has a piston rod 126 slidable therein which is pivoted to the strut extension 128 at 130 and to the airplane frame at 132. Hydraulic cylinder 110 is operatively connected with the hydraulic system control panel 60 so that the operation of the nose wheel is coordinated with the operation of the landing wheels 62 and 64. To retract the landing gear, the motor 110 is energized by line 136 to rotate strut 102 counter-clockwise as viewed in FIGURE 7. To extend the landing gear, the motor 110 is energized by line 134 so as to rotate the strut 102 and its extension 128 in a clockwise direction as viewed in FIGURE 7. The lines 134 and 136 are energized by means of the control panel 60. As shown in FIGURE 7, the landing gear 102 is considerably longer than the well 106. Accordingly, a well extension 138 is provided in the bottom of the fuselage behind the well 106. The well 138 has doors 140 and 142 pivoted to its edges by hinges at 144 and 146. While the doors 140 and 142 may be operated by conventional hydraulic cylinders connected to the control panel 60, the doors 140 and 142 are preferably operated by conventional hydraulic cylinders such as the type shown at 110 which are connected to the doors in a conventional manner and connected to the control panel 60 so as to open and close the doors 140 and 142 when the landing gear is extended and retracted respectively. Since the motor for controlling these doors is of conventional design and connected in a conventional manner to the doors, it has been omitted from the drawings for purposes of clarity since it does not constitute any part of this invention. Although panel 104 is a cover for well 106, it is also a lift and drag producing device. The airplane will become nose heavy when the wing is extended (during take-off and landing) due to the rearward shift of the wing tip portions as they are extended. The movement of panel 104 to an angle of 45° or less counteracts this condition. FIGURE 10 shows one way of coordinating the movement of the strut 102 and panel 104. It consists of a spring biased extensible link 116 made of a rod 118 in a tube 120 with a head 122 on the rod and the tension spring 124 connected to an end of the tube and head 122. The ends of the link 116 are pivoted to panel 104 and strut 102, and the extensible nature of the link 116 compensates for the differences in hinge positions of strut 102 and panel 104. The link 116 is given by way of example only of a suitable means of connecting the panel 104 and strut 102 for simultaneous movement.

The features and operation of the invention have been described previously. However, it is to be clearly understood that various changes may be made without departing from the scope of the following claims.

What is claimed as new is as follows:

1. In an airplane which has wing semi-spans consisting of inboard panels and tip portions, means connecting the tip portions with the inboard panels for extension and retraction with reference to the inboard panels, landing wheels and struts, said struts pivoted to said inboard panels, cover panels extending between struts and tip portions and operatively movably connected at their ends directly with said struts and said tip portions to actuate said struts between extended and retracted positions in coordination with the extension and retraction of said tip portions.

2. In an airplane which has wing semi-spans consisting of inboard panels and tip portions, means connecting the tip portions with the inboard panels for extension and retraction with reference to the inboard panels, landing wheels and struts, said struts pivoted to said inboard panels, cover panels operatively connetced with said struts and said tip portions to actuate said struts between extended and retracted positions in coordination with the extension and retraction of said tip portions, a nose wheel, a strut pivoted at its upper end to the airplane frame, a lift and drag producing cover panel connected with the nose wheel strut and the frame of the airplane, and means operable during the extension and retraction of said tip portions for adjusting the position of the last mentioned panel and actuating the nose wheel and strut relative to the airplane.

3. In an airplane which has wing semi-spans consisting of inboard panels and tip portions, means connecting the tip portions with the inboard panels for extension and retraction with reference to the inboard panels, landing wheels and struts, said struts pivoted to said inboard panels, cover panels operatively connected with said struts and said tip portions to actuate said struts between extended and retracted positions in coordination with the extension and retraction of said tip portions, a nose wheel, a strut pivoted at its upper end to the airplane frame, a lift and drag producing cover panel connected with the nose wheel strut and the frame of the airplane, and means operable during the extension and retraction of said tip portions for adjusting the position of the last mentioned panel and actuating the nose wheel and strut relative to the airplane, fairings connected between said tip portions and said inboard panels and movable with said tip portions as said tip portions are adjusted to cover the openings between the inboard panels and said tip portions.

4. In an airplane which has wing semi-spans consisting of inboard panels and tip portions, means connecting the tip portions with the inboard panels for extension and retraction with reference to the inboard panels, landing wheels and struts, said struts each pivoted at one end directly to said inboard panels, cover panels operatively pivotally connected at one of their ends with the movable ends of said struts and the other ends of said panels spaced from said struts and pivotally connected directly to said tip portions to actuate said struts between extended and retracted positions in coordination with the extension and portions and located between said tip portions and said retraction of said tip portions, fairings attached to said tip inboard panels to cover the opening between said tip portions and said inboard panels when said tip portions are extended.

5. In an airplane which has semi-spans, said semi-spans each including an inboard panel and tip portion longitudinally slidable within the inboard panel in a swept back direction, means for extending and retracting said tip portions out of and within said inboard panels, a landing gear pivotally connected at one end directly with said semi-spans, and diagonal brace means movably connected directly between said tip portions and the other end of said landing gear for retracting and extending said landing gear in unison with the adjustment of said tip portions.

6. The subject matter of claim 5, wherein the landing gear includes a nose wheel and nose wheel strut connected with the airplane below the nose, and operating means connected with said nose wheel strut which is also connected with the means for extending and retracting said tip portions.

7. The subject matter of claim 6, wherein said nose wheel strut actuating means includes a panel which is a lift and drag producing panel.

8. In an airplane which has wing semi-spans each consisting of inboard panels and tip portions, lift producing means connecting the tip portions with the inboard panels for extension and retraction with reference to the inboard panels, landing wheels and struts, said struts pivoted to said inboard panels, rigid links separate from said struts and operatively connected directly between ends of said struts and said tip portions to directly actuate said struts between extended and retracted positions in coordination with the extension and retraction of said tip portions.

9. An airplane including swept back wing semi-spans on opposite sides thereof, each semi-span being retactable and extensible along its longitudinal swept back axis, first power means in each semi-span for retracting and extending it, a landing gear assembly forwardly of said semi-spans mounted below a nose of the airplane and comprising a strut having a wheel on its lower end and a lift producing fairing connected between the landing gear assembly and airplane, other power means connected to said landing gear assembly for extending it and the fairing at the same time the first power means extends said semi-spans whereby the downward pitching movement caused by the extension of said semi-spans is balanced by the lift of said fairing.

10. The subject matter of claim 5, wherein that portion of said tip portions which retracts into the inboard panels includes lift producing panels.

11. The subject matter of claim 6, wherein that portion of said tip portions which retracts into the inboard panels includes lift producing panels, said nose wheel strut actuating means including a panel which is a lift and drag producing panel.

12. An airplane having wing semi-spans each consisting of an inboard panel and a tip portion connected thereto for movement in a spanwise direction, a pair of landing gear struts each pivotally connected at one end to one of the inboard panels, a landing wheel connected by journal means to the other end of each strut, substantially rigid brace means extending diagonally between each tip portion and each landing gear strut, first connecting means movably connecting one end of each brace means directly to one of said tip portions, second connecting means movably connecting the other end of each brace means directly to the other end of each strut, power means connected to said tip portions for extending and retracting same, said brace means causing said tip portions and said struts to retract and extend in unison.

13. The combination of claim 12 wherein said first and second connecting means comprise pivot means and said brace means includes fairing for covering landing gear recesses in said airplane when said struts are retracted.

References Cited in the file of this patent

UNITED STATES PATENTS

| | | |
|---|---|---|
| 1,904,281 | Ellingston | Apr. 18, 1933 |
| 2,249,729 | Fitzurka | July 22, 1941 |
| 2,425,306 | Conner | Aug. 12, 1947 |
| 2,570,534 | Erny | Oct. 9, 1951 |
| 2,858,091 | Kapenkin | Oct. 28, 1958 |